No. 778,009. PATENTED DEC. 20, 1904.
H. J. CASE.
GRAIN DRILL.
APPLICATION FILED SEPT. 6, 1904.
NO MODEL.
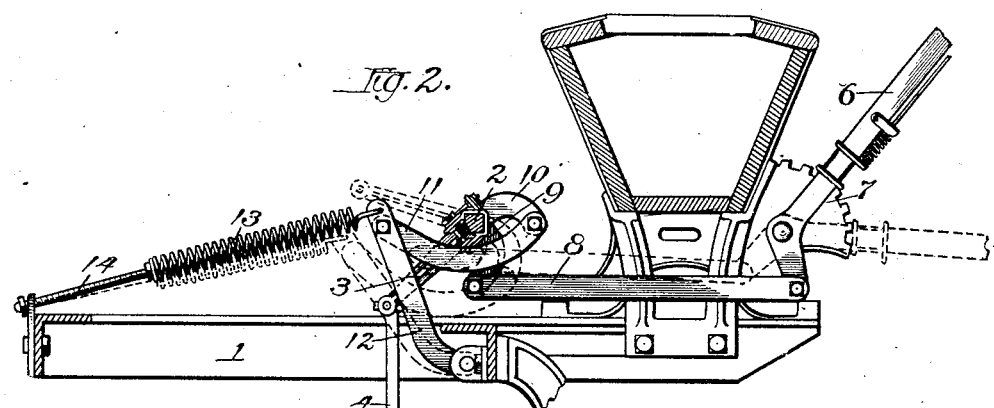
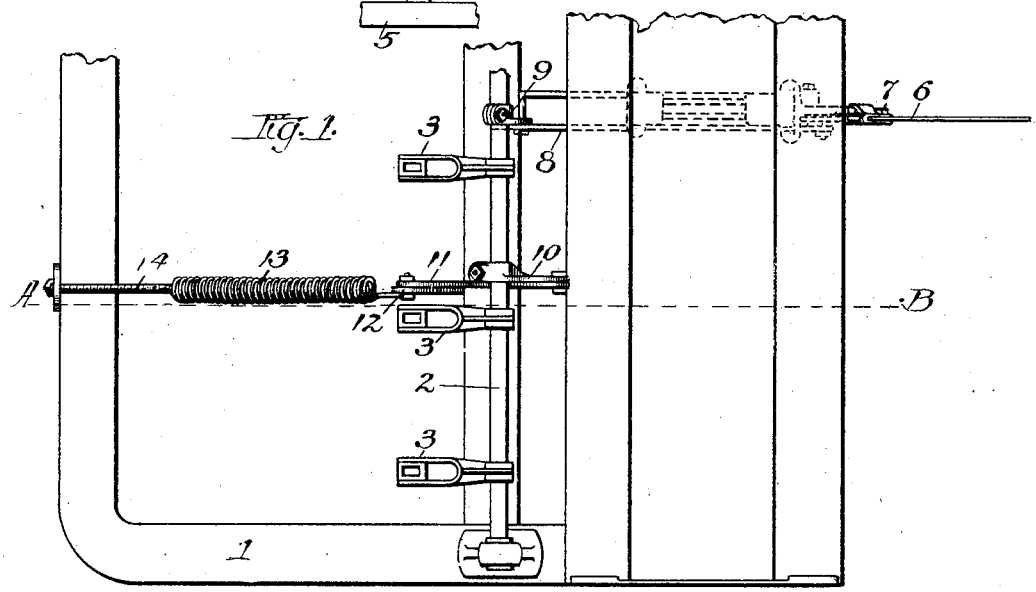
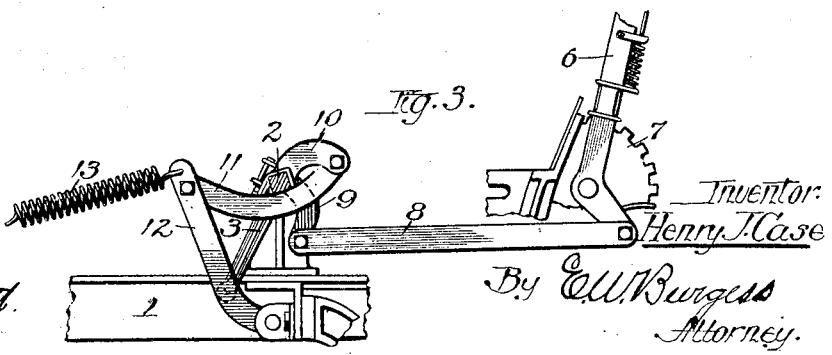
Witnesses:
Inventor:
Henry J. Case
By E. W. Burgess
Attorney.

No. 778,009.                                    Patented December 20, 1904.

UNITED STATES PATENT OFFICE.

HENRY J. CASE, OF OWASCO, NEW YORK, ASSIGNOR TO INTERNATIONAL HARVESTER COMPANY, OF CHICAGO, ILLINOIS, A CORPORATION OF NEW JERSEY.

GRAIN-DRILL.

SPECIFICATION forming part of Letters Patent No. 778,009, dated December 20, 1904.

Application filed September 6, 1904. Serial No. 223,312.

*To all whom it may concern:*

Be it known that I, HENRY J. CASE, a citizen of the United States, residing at the town of Owasco, in the county of Cayuga and State of New York, have invented certain new and useful Improvements in Grain-Drills, of which the following is a specification, reference being had to the accompanying drawings, forming a part thereof.

This invention relates to counterbalancing mechanism for grain-drills, and has for its object to provide means whereby the controlling of the operative parts of such implements may be facilitated. In the specific form in which its application is illustrated I have shown the same as applied to the raising and lowering mechanism of a grain-drill in which a rock-shaft provided with a plurality of lever-arms connected by links with the drag-bars forms part of the mechanism.

In the drawings, Figure 1 represents a plan view of a portion of a grain-drill with the counterbalancing mechanism connected therewith. Fig. 2 is a sectional elevation of a part of Fig. 1 on line A B, and Fig. 3 is a detail of a part of the counterbalancing and other mechanism.

Like reference-numerals represent the same parts throughout the various views.

1 represents a portion of the main or wheel frame.

2 is a rock-shaft suitably mounted on the main frame and provided with lever-arms 3, that are connected, by means of links 4, with the drag-bars 5 in a well-known way.

Mounted on the main frame is a hand-lever 6, having the usual sliding detent engaging with a sector-rack 7 and is connected, by means of a link 8, with a lever-arm 9, secured to the rock-shaft 2 in a manner to cause the said shaft to rock in its bearings when the hand-lever is manipulated and raise or depress the drag-bars in a well-known way. Secured to the rock-shaft 2 is a lever-arm 10, projecting rearward when the drag-bars are in a lowered position. A curved link 11 is pivotally connected to the lever 10 and extends beneath and forward of the rock-shaft 2.

Pivoted to the main frame is a lever 12, that has its upper end pivotally connected with the forward end of the curved link 11, and a counterbalancing-spring 13 has one end attached to the upper end of lever 12 and its opposite end connected with the main frame by means of the threaded adjusting-rod 14. The counterbalancing mechanism as constructed operates to assist the operator to elevate the drag-bars to raise the hoes or teeth clear of the ground, but does not act to depress them. It has been found desirable to allow the drag-bars and hoes a free movement within certain limits when in working position unaffected by the spring counterbalancing mechanism. To attach the spring directly to the arms 10 or connecting-link 11 is a common construction, but one not fully satisfactory in that when the drag-bars are depressed to working position the line of pivotal connections of the spring with the lever-arm on the rock-shaft and the frame passes above the axis of the rock-shaft, and the spring operates to further depress the drag-bars. By providing a supplemental compensating link 12 the line of pivotal connections before mentioned is controlled in a manner that renders the spring inactive to depress the hoes or drag-bars during a limited movement of the rock-shaft when the drag-bars are in working position, but will operate to deflect the spring and link at their joint and change the direction of the pull of the spring and, in effect, increase the leverage of arm 10 when it is desired to lift the drag-bars above their operative position, as is shown by dotted lines in Fig. 2.

What I claim, and desire to secure by Letters Patent, is—

1. In a counterbalancing spring mechanism for grain-drills, the combination of the drag-bars and means for raising and lowering them from and to operative position, a counterbalancing-spring having one end connected with a fixed part of the machine and its opposite end connected by means of a link with a lever secured to the drag-bar-adjusting mechanism, a link pivoted at one end to a fixed part of the machine and having its opposite end connected with the spring-connecting link.

2. In a counterbalancing spring mechanism for grain-drills, the combination of the main frame and drag-bars, a rock-shaft mounted upon the main frame, connections between the rock-shaft and drag-bars adapted to raise or depress said drag-bars when the shaft is rocked, a lever secured to said rock-shaft, a counterbalancing-spring secured at one end to a fixed part of the main frame, a link connecting its opposite end with the lever secured to the rock-shaft, and means for deflecting the joint between the spring and link as the rock-shaft is turned in its bearings.

3. In a counterbalancing spring mechanism for grain-drills, the combination of the main frame and drag-bars, a rock-shaft mounted upon the main frame, connections between the rock-shaft and drag-bars adapted to raise or depress said drag-bars when the shaft is rocked, a lever secured to said rock-shaft, a counterbalancing-spring having one end secured to the main frame, a link connecting its opposite end with the lever secured to the rock-shaft, a bar pivoted at one end to the main frame and having its opposite end connected with the spring and link at or near their point of connection.

In witness whereof I hereto affix my signature in presence of two witnesses.

HENRY J. CASE.

Witnesses:
  LUD. HOLLAND-LETZ,
  H. C. BUFFINGTON.